Sept. 14, 1926.

F. W. MEYER 1,599,668

CONTROLLING AND REGULATING APPARATUS FOR ENERGY CONVERSION MACHINES

Filed Nov. 20, 1919 6 Sheets-Sheet 1

Inventor
Friedrich W. Meyer
By Edwin B. H. Tower Jr.
Atty.

Sept. 14, 1926. 1,599,668
F. W. MEYER
CONTROLLING AND REGULATING APPARATUS FOR ENERGY CONVERSION MACHINES
Filed Nov. 20, 1919 6 Sheets-Sheet 2

Fig. 3

Inventor
Friedrich W. Meyer
By: Edwin B. H. Tower Jr.
Atty.

Sept. 14, 1926.　　　　　　　　　　　　　　　　1,599,668
F. W. MEYER
CONTROLLING AND REGULATING APPARATUS FOR ENERGY CONVERSION MACHINES
Filed Nov. 20, 1919　　　6 Sheets-Sheet 4

Inventor
Friedrich W. Meyer
By: Edwin B. H. Tower Jr. Atty.

Sept. 14, 1926. 1,599,668
F. W. MEYER
CONTROLLING AND REGULATING APPARATUS FOR ENERGY CONVERSION MACHINES
Filed Nov. 20, 1919 6 Sheets-Sheet 5

Fig. 7

Inventor
Friedrich W. Meyer
By: Edwin B. H. Towne Atty.

Fig. 9

Inventor
Friedrich W. Meyer
By: Edwin B. H. Tower Jr.
Atty.

Patented Sept. 14, 1926.

UNITED STATES PATENT OFFICE.

FRIEDRICH WILHELM MEYER, OF MILWAUKEE, WISCONSIN, ASSIGNOR TO THE CUT-
LER-HAMMER MFG. CO., OF MILWAUKEE, WISCONSIN, A CORPORATION OF WIS-
CONSIN.

CONTROLLING AND REGULATING APPARATUS FOR ENERGY-CONVERSION MACHINES.

Application filed November 20, 1919, Serial No. 339,422, and in Germany May 14, 1915.

This invention relates to controlling and regulating apparatus for energy conversion machines.

It relates more particularly to the regulation and control of machines for converting the energy in a fluid to kinetic energy. Such machines are usually known as prime movers.

It has heretofore been the practice to regulate, or control, prime movers by means of governors of the mechanical type which communicate their motion, due to a change in the functioning of the prime mover, to the controlled valves. There was, therefore, the necessity for a mechanical motion of the governor, that is to say a readjustment of the parts, due to a speed change, before any control effect could be impressed upon the valves. Inasmuch as every mechanical element has inertia, a delay, or lag would result between the time the necessity for a change existed and the time at which the change was inaugurated.

Merely to increase the sensitiveness, or vary the magnitude of the power under the control of the governor, does not secure the stability, accuracy, and instantaneousness of control sought; the direct result being an increased tendency to hunt, or in other words, to produce undesirable and dangerous oscillations in the system as a whole.

The present invention overcomes these defects, by providing means which impress a regulating effect upon the energy conversion machine substantially coincidently with the need therefor, and remove such effect instantly when the effect is no longer needed.

An object of the present invention is to produce more sensitive and stable regulation of machines for converting the energy in a fluid to kinetic energy and eliminate or lessen hunting.

Another object is to produce a regulating effect substantially coincidental and in accordance with the variation in load and power conditions of a steam or internal combustion engine.

Another object is to produce a regulating effect substantially simultaneously with a variation in speed of a prime mover.

Another object is to provide regulating means which will respond to a slight variation in operating conditions of a prime mover and accurately compensate therefor.

Other objects and advantages will hereinafter appear.

The invention will be explained herein as applied to controlling and regulating a reciprocating steam engine, a steam turbine and an internal combustion engine, but it is susceptible of being adapted to control and regulate other prime movers.

In accordance with this invention as employed to regulate an engine or turbine, the engine or turbine is regulated primarily through an electroionic valve, the effect of which is controlled by means which respond substantially coincidently with a variation of load or other conditions whereby the machine is regulated substantially coincidently and in accordance with varying operating conditions.

The invention is diagrammatically illustrated in the accompanying drawings in which.

Figure 1:
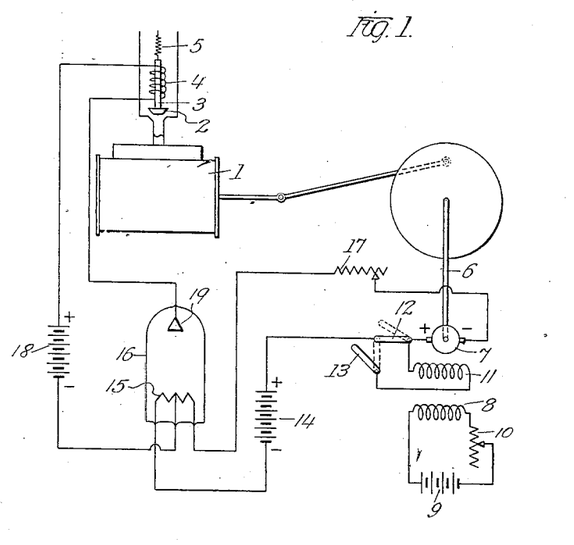
Fig. 1 shows the regulating apparatus applied to a reciprocating steam engine, the electroionic valve being provided with a heated cathode to control its effect.

Fig. 1 will first be described. A steam engine cylinder 1 is supplied with steam under the control of a valve 2. A stem 3 extends from the valve 2 and forms the movable core of a coil 4. The valve may normally be held closed by a spring 5, and is opened by the lifting action exerted by the coil 4 when such coil is supplied with current. In place of the plunger magnet shown, other forms of magnet may be employed to operate the valves in the several systems. The magnet may have either the characteristic of opening the valve amounts proportional to the current, or of completely opening the valve so that the valve is either wide open or completely closed. The spring 5, which tends to close the valve, may be dispensed with, in certain cases, and the steam pressure may be utilized to close the valve. The operation of the magnet, and consequently that of the engine, is controlled by the electric system which will be described.

Upon the engine shaft 6 the armature 7 of a tachometer is mounted. This tachometer may be a small direct current machine with either a separately excited field or a compound field. The separately excited field 8 is supplied from a battery 9 and its strength is adjusted by means of a rheostat 10. A series field 11 may be placed in the armature circuit by moving the switches 12 and 13 to their dotted line positions, or may be completely cut out, by allowing the switches to occupy the positions shown in full lines.

In the armature circuit of the tachometer a battery 14 opposes the E. M. F. of the tachometer and normally predominates to an extent sufficient to cause the glowing of the filament 15 of the electroionic valve 16. The normal value of the current in this circuit may be regulated by a variable resistance 17.

The current for energizing the coil 4 of the valve controlling magnet, is supplied by a battery 18 and passes from the positive pole of such battery through the coil 4, and returns to the negative pole. In this circuit the electroionic valve 16 is included by having the anode 19 connected to one terminal of the coil 4 and the mid point of the cathode 15 connected to the negative pole of the battery.

When the cathode 15 is heated, electrons are emitted which pass to the anode 19. The rate at which these electrons are emitted depends upon the temperature of the cathode 15, and the effect, in the external circuit including the coil 4 and battery 18, is to increase the current flowing through the coil 4 when the temperature of the filament is increased, and decrease such current when the temperature of the filament is decreased.

The electroionic valve 16 may be a vessel evacuated to any desired degree, or it may be a vessel having traces or even higher pressures of a particular gas such as argon, for instance. The purpose of this electroionic valve is to secure a relay effect, so that a powerful control of the magnet circuit may be secured by a small variation, at a critical voltage, of the current flowing in the tachometer circuit.

The voltage of battery 14 is slightly greater than the normal tachometer voltage and is opposed thereto. This difference in voltage is the effective voltage for forcing a heating current through the filament. The result of this approximate balancing of the voltage is that a pronounced variation in current through the filament is secured by a very small change in tachometer voltage. Thus, a minute change in the tachometer voltage will make a relatively large change in the resulting voltage impressed upon the filament and a relatively large change in the heating current for the filament.

When the speed of the engine falls, the tachometer generates a smaller E. M. F. and the difference between this E. M. F. and that of the battery 14 is increased, allowing an increase in the current passing through the filament and raising its temperature. The current in the circuit of the coil 4 is very much and sharply increased, as the electroionic valve acts as a powerful relay, whereby the engine receives a magnified corrective influence tending to increase its speed.

When the speed of the engine increases, the tachometer E. M. F. increases, changing the difference between the battery voltage and the tachometer voltage, thereby decreasing the current flowing through the filament, and producing a great decrease in the current in the magnet coil 4, whereby the engine receives a magnified corrective influence tending to decrease its speed.

The speed of the engine may be regulated to any desired value by regulating the field rheostat 10 of the tachometer or the variable resistance 17, preferably by the field rheostat, as increasing the resistance 17 makes the system less sensitive.

Ordinarily the characteristics of a prime mover cannot be altered, but by placing the series field 11 in the tachometer armature circuit, by means of the switches 12 and 13, the characteristics may be readily varied.

If the series field is arranged to increase the tachometer field when the battery 14 predominates, a decrease in speed will allow the battery 14 to force more current through the circuit, thereby slightly increasing the field and partially off-setting the effects of the decrease in speed. In this case there will be a less pronounced correction for decrease in speed than in the case when the separately excited field alone is used. Thus, when the load comes on, energy will be drawn from the rotating flywheel of the engine.

An increase of speed will allow the battery 14 to send less current through the circuit and the tachometer field will be slightly weakened, thereby partially offsetting the effect of the increase in speed, and making the correction less pronounced than in the case where the separately excited field alone was used. Thus, when the load is lessened, energy will be stored in the rotating flywheel.

A different characteristic of the system may be obtained by having the series field weaken the tachometer field when the battery 14 predominates. In this case, a decrease in speed will allow the battery 14 to force more current through the circuit and will weaken the field, thereby making the effect of decrease in speed produce a more pronounced correction for decrease in speed than when the separately excited field of the tachometer alone is used. An increase in speed due to a decrease in load causes less current to be passed through the series field and thereby strengthens the tachometer field, thereby producing a more pronounced correction for an increase in speed than when the separately excited field of the tachometer alone is used.

Figure 2:
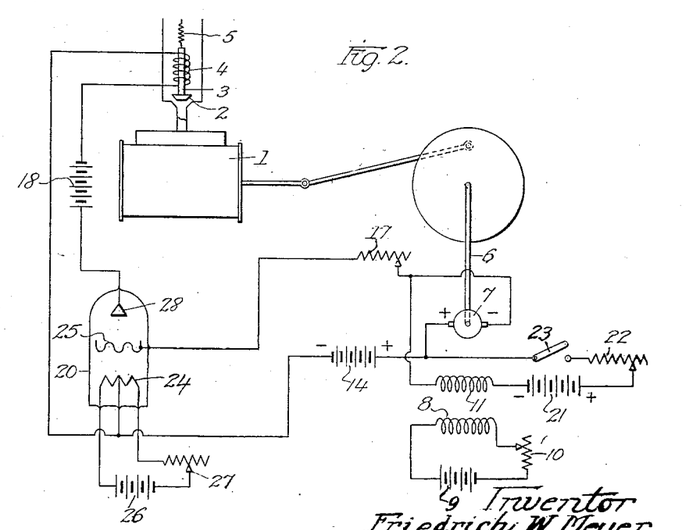
Fig. 2 shows a similar apparatus, the electroionic valve being provided with an auxiliary electrode or anode to control its effect.

Fig. 2 shows a system very much like that shown in Fig. 1, differing therefrom essentially in that an auxiliary circuit is provided for the series field 11 of the tachometer, and that grid control is utilized in the electroionic valve 20.

The auxiliary circuit for the series field includes a battery 21 and a rheostat 22, and switch 23 by means of which the series field may be thrown into or out of effective relation to the system. Any one of the characteristics secured in the system shown in Fig. 1 may be secured in this system, by a similar arrangement of the effect of the series field in relation to the field produced by separate excitation and by a similar relative arrangement of the voltage of the battery 21 and the voltage of the tachometer.

The increased sensitiveness secured in the system shown in Fig. 1 by having the battery and tachometer voltages almost balanced, is also secured in this system. In this system, the battery and tachometer voltages, under normal condition, may either be exactly balanced, or one or the other may predominate to a slight degree, depending upon the characteristics of the electroionic valve employed. Thus, a minute change in the voltage of the tachometer will produce a relatively large change in the potential of the grid with respect to the filament.

The electroionic valve 20 may be a vessel evacuated to any desired degree or it may be a vessel having traces or even higher pressures of a particular gas such as argon, for instance. The purpose of this electroionic valve is the same as that of the valve 16 of Fig. 1, but the control of the magnet circuit current passing from the anode 28 to the heated cathode 24 is secured by impressing suitable charges upon the grid 25. In no case does the current in the sensitive circuit rise above a minute value, while in the case of negative control, control by negative charges upon the grid, the current in the sensitive circuit may even become zero. The current for heating the cathode is supplied by a battery 26 and regulated by a variable resistance 27.

The current passing through the valve 20 is dependent upon the grid voltage; the higher this voltage the more current, providing the voltage of the battery 18 is not changed too much and that the temperature of the filament is such that sufficient electrons are provided. If the grid voltage is diminished, the main circuit current is diminished, and, at a certain grid voltage the main current becomes zero. This critical grid voltage may still be positive, it may happen to be zero, or it may even be negative, depending upon the type of electroionic valve used.

The characteristics of electroionic valves of extremely high vacuum are such that the curve indicating the relation between the grid voltage and the main current usually begins with low negative grid voltages. The part of the characteristic that is used, is the part which gives the greatest change of main current for the least change of grid voltage. A valve may be used which has this relatively straight characteristic when the grid voltage is negative, thereby giving the advantage that the control is wholly potential control whereby the sensitive circuit carries no current and is therefore free from inductive effects. Or a valve may be used in which the relative straight part of the characteristic curve corresponds to positive grid voltages, in which case, there will be a minute current flowing in the sensitive circuit.

Figure 3:
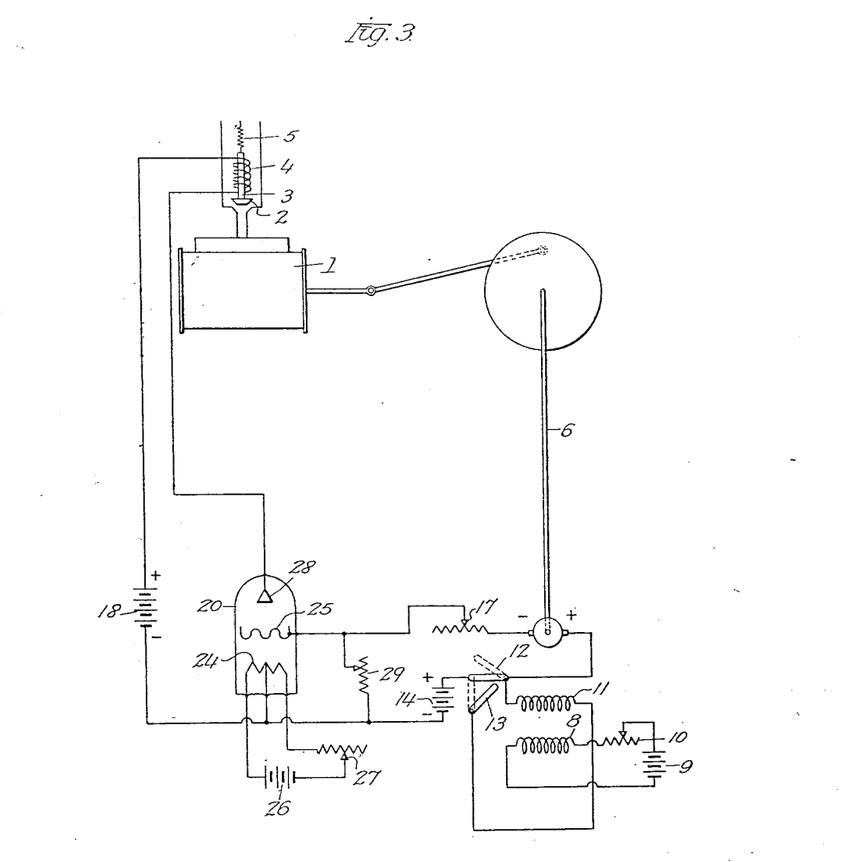
Fig. 3 shows similar regulating apparatus, the tachometer machine being provided with a series field.

Fig. 3 also shows the apparatus applied to control and regulate the steam admission valve, the tachometer being provided with a series field winding 11 connected directly in the sensitive circuit. An adjustable resistance 29 bridged across cathode 24 and the grid 25 allows the current in the tachometer circuit to assume a value which is effective to energize the series field winding 11.

The regulating apparatus of Fig. 3 produces the same controlling and regulating effects as that of Fig. 2. Furthermore, all the characteristics of the regulating apparatus of Figs. 1 and 2 obtain in that of Fig. 3.

When the effect of the series coil 11 is not desired the variable resistance 29 may be removed by manipulating the switches 12 and 13.

It is to be understood that any of the arrangements of series field circuit may be utilized in any of the systems that have been described or that will hereinafter be described, but for the sake of clearness the series field will be omitted from the following systems.

The electroionic valves used in the different systems may be interchanged. Although different valves are used in different systems, the particular valve shown in a certain system is not to be considered as the only valve that may be used in such system.

A certain gas or vapor pressure in the electroionic valve may be found desirable in certain cases, as, for example, where relatively large currents and relatively low voltages are used. It is of no consequence if the critical or normal working point on the characteristics of such valves necessitates a positive grid voltage, for even under such conditions the current in the sensitive circuits are small.

Figures 4, 5:
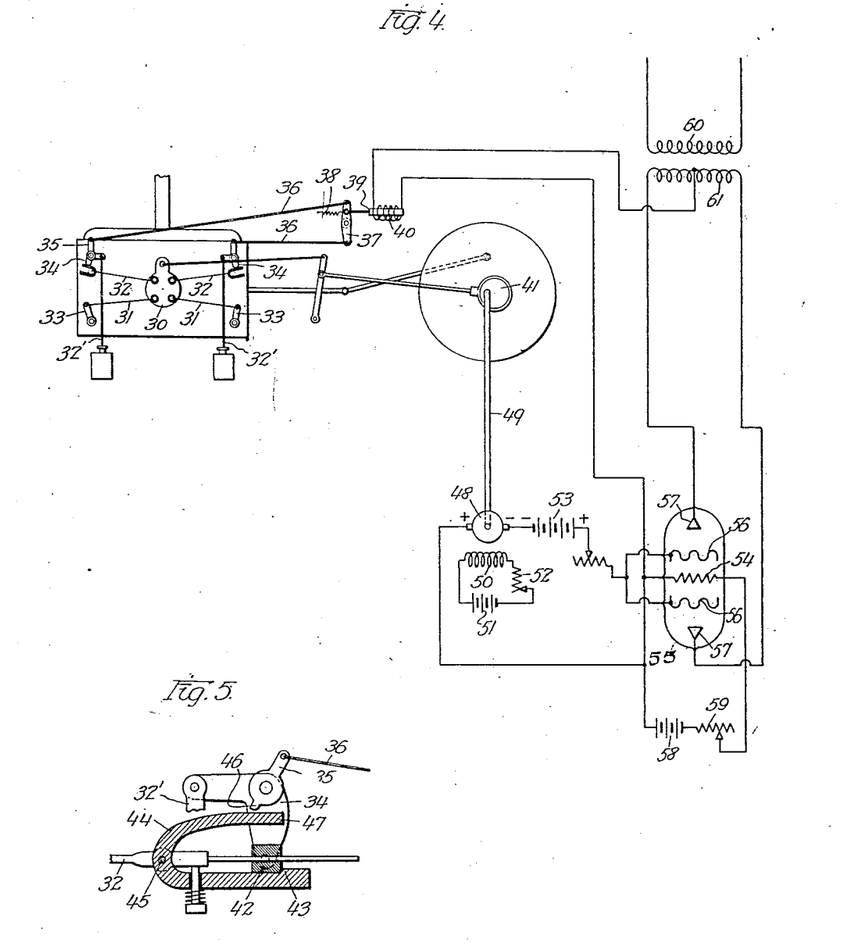
Fig. 4 shows the apparatus applied to control and regulate the point of cut-off of a steam engine, the electroionic valve also serving as a rectifier through which control current is supplied from an alternating current source.
Fig. 5 shows a view in detail of the cut-off operating mechanism employed in the system of Fig. 4.

Fig. 4 shows a system in which an engine of variable cut-off is employed, the control being effected by electroionically varying the point of cut-off. The engine is provided with a rocker-plate 30 which communicates the motion of the eccentric 41, through the medium of the rods 31 and 32, to the levers 33 and 34 which are fastened respectively, to the spindles of the exhaust and inlet valves. The levers 33 are controlled entirely by the rocker-plate 30, but the bell-crank levers 34, one arm of which is connected to the dashpot rods 32' are controlled in their opening motion by the rocker-plate 30 and in their closing motion by the pull of the dashpot rod. The point at which the levers 34 are disconnected from the rods 32', determines the point of cut-off. This point of cut-off is determined by the position of the levers 35, which are loosely mounted upon the valve spindles. The position of these levers 35 is controlled by the current flowing through the magnet coil 40; the pull of the coil upon the plunger 39 being resisted by the spring 38, so that the positioning of the lever 37, the rods 36 and the levers 35, is determined by the strength of the current.

Fig. 5 shows a detail of the admission valve mechanism. The lever 34 has swivelled, at its lower end, a square sleeve 42 through which the rod 32 is adapted to reciprocate. A forked member 44 is pivoted at 45 to the rod 32, and has its lower arm spring pressed upwardly. In its upper position a catch 43, on the forked member 44, engages the square sleeve 42 and thereby connects the rod 32 with the lever 34. The adjustable lever 35 has a projection 46 which engages the upper arm 47 of the forked lever at some point in the stroke of the rod 32, and causes the disengagement of the catch 43 and square sleeve 42, thereby allowing the lever 34 to be rocked by the dashpot rod to close the inlet valve. Therefore, the position of the plunger 39, through the medium of the connecting mechanism, determines the position of the levers 35, and consequently the point of cut-off.

Fig. 4 shows the tachometer 48, whose armature is mounted upon the engine shaft 49, and whose field coil 50 is supplied with current from a battery 51 through a rheostat 52. The E. M. F. of the tachometer is opposed by that of a battery 53. The positive brush of the tachometer is connected to the cathode 54 of the electroionic valve 55 and the positive pole of the battery 53 is connected to the grids 56.

The electroionic valve 55 has two anodes 57, and two grids 56, one grid to each anode, positioned between such anode and the common cathode 54. The cathode is heated by means of current from a battery 58 and its temperature is regulated by means of a variable resistance 59.

A transformer has its primary 60 connected with a source of alternating current and the terminals of its secondary connected to the anodes 57 of the electroionic valve. The mid point of the secondary is connected to one terminal of the magnet coil 40, the other terminal of the coil 40 being connected to the cathode.

Rectified current passes through the coil 40, as the half waves of the secondary current are passed alternately from the anodes 57 to the common cathode 54. The value of the current and, correspondingly, the point of cut-off of the admission valves, is determined by the potentials impressed upon the grids 56.

A decrease in speed allows the effect of the battery 53 to become more pronounced, thereby allowing more current to be supplied to the magnet coil, and produces a later cut-off. An increase in speed produces a lessening of the current flowing in the magnet coil 40 and produces an earlier cut-off.

The normal speed of the engine may be regulated and the characteristics and sensitiveness of the system may be changed, in the manner previously described.

Instead of controlling a plurality of valves by a single electromagnet, each valve may be individually controlled by a separate electromagnet which are themselves under the influence of electroionic valve or valves.

Figure 6:
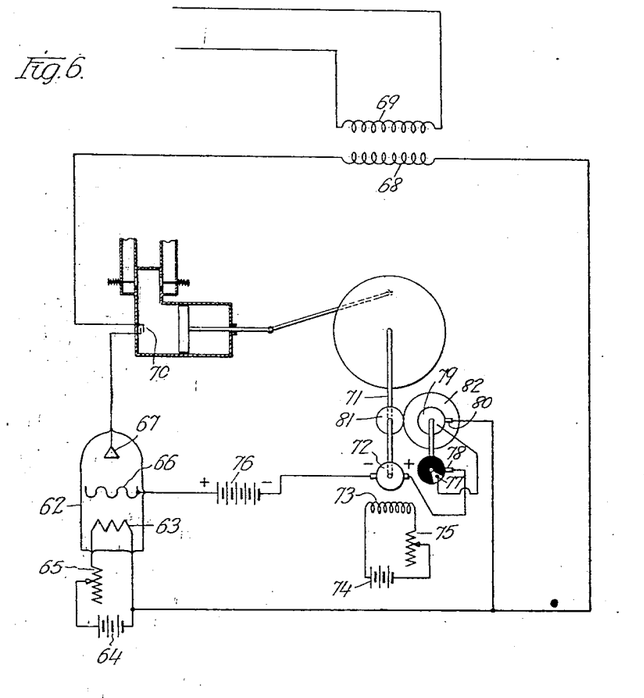
Fig. 6 shows the regulating apparatus applied to a gas engine, the electroionic valve controlling the ignition of the explosive mixture.

Fig. 6 shows a regulating apparatus applied to control and regulate a gas engine. In this system the speed is controlled by an electroionic valve 62 which comprises a cathode 63 heated by a battery 64 and regulated by a variable resistance 65, a grid 66, and an anode 67. The high tension spark circuit includes the secondary 68 of a transformer whose primary 69 is connected to a source of alternating current, the spark plug 70, and the part of the electroionic valve from the anode 67 to the cathode 63. When the electroionic valve allows a discharge to pass, sparks are produced at the spark plug 70.

Upon the shaft 71 of the gas engine, a tachometer armature 72 is mounted. This tachometer, although shown as separately excited by having its field coil 73 supplied with current by a battery 74 and regulated by a rheostat 75, may be similar to any of those previously described.

The tachometer E. M. F. is opposed by a battery 76, the battery normally predominating so as to impress a positive charge upon the grid 66.

The spark is allowed to occur during a predetermined period in the cycle, by having a rotating contact 77 placed in the sensitive circuit and thereby allowing the energization of this circuit only between predetermined points, or in other words at some time during a predetermined interval, in the cycle of the gas engine. The contact 77 co-operates with a brush 78 connected to one terminal of the sensitive circuit, and at a predetermined time connects such brush to the other brush 80 which is connected to the other terminal of the sensitive circuit. The brush 80 bears upon a slip ring 79 which is electrically connected to the contact 77. The slip ring 79 and contact 77 are rotated by means of a two to one reduction gearing comprising the gears 81 and 82, if the engine is of the four cycle type.

For the purpose of simplifying the drawing, the mechanism of the engine not directly related to this system has been omitted.

When the speed of the engine decreases the effect of the tachometer is less pronounced and the spark occurs at an earlier point in the cycle of the engine, between predetermined limits. When the speed of the engine increases the effect of the tachometer is more pronounced and the spark occurs at a later point in the cycle; for when the explosion normally would begin the speed of the engine has not fallen to such a point as to allow the discharge to take place but the speed may yet fall to such a point before the permissible explosion period has elapsed. Therefore, by having a relatively wide contact 77 a possible variation in the timing of the spark, between certain limits, may be obtained.

Also, if the speed of the engine rises above a predetermined point, the discharge does not occur at all, during one or more cycles of the engine, and a further control is, therefore, provided for the speed of the engine.

Figure 7:
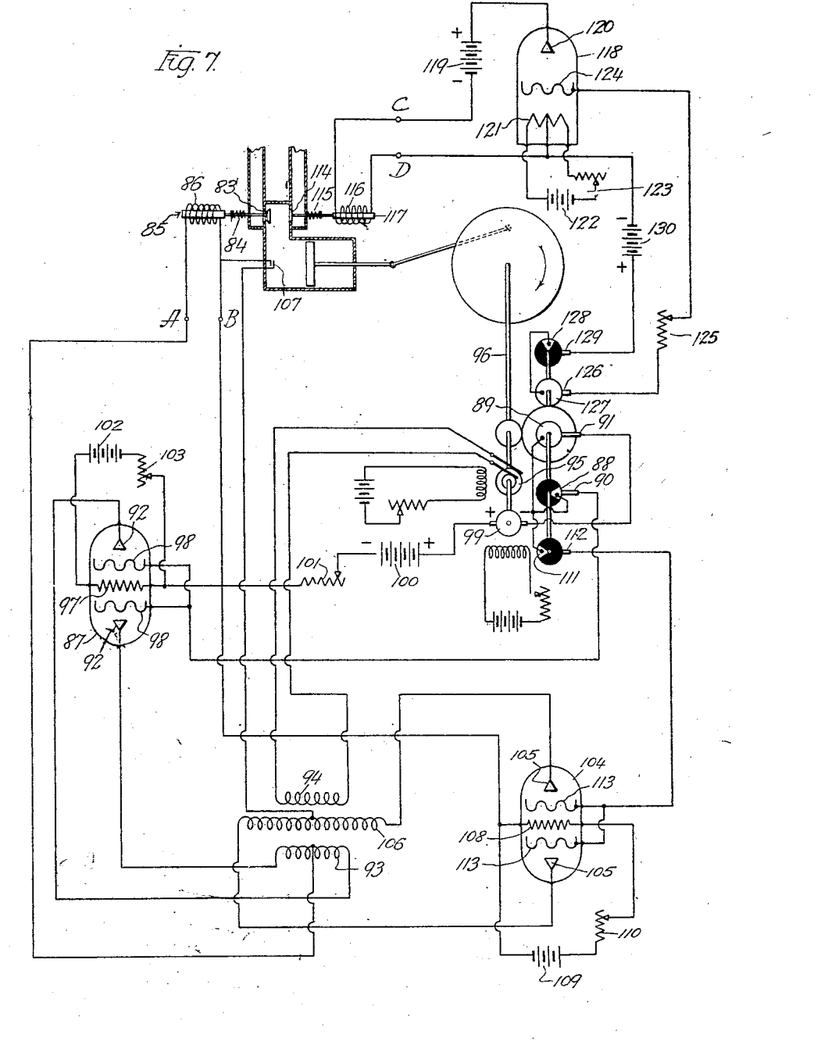
Fig. 7 shows regulation apparatus applied to a gas engine, electroionic valves being employed to control and regulate the admission of the explosive mixture, the ignition thereof and the exhaust of the burned gases.

Fig. 7 shows a system for regulating a gas engine by controlling the spark and inlet valve by electroionic means. The inlet valve 83 is closed by a spring 84 and opened by an electromagnet whose plunger 85 is connected to the valve and whose coil 86 is supplied with current controlled by the electroionic valve 87. The operation of this valve 83 is timed by a rotating segment 88 connected to a slip ring 89, which intermittently connects the brushes 90 and 91, thereby closing the sensitive circuit of the electroionic valve 87 and permitting the opening of the valve 83 during a predetermined period in the cycle of the gas engine. The amount, or extent, of opening of the valve 83 is controlled by the electroionic valve 87; the magnet having the characteristic of opening the valve 83 amounts corresponding to the strength of the current passing through the magnet coil 86.

The electroionic valve 87 is similar to the electroionic valve 55 of the system shown in Fig. 4. The anodes 92 are connected to the terminals of the secondary 93 of a transformer whose primary 94 is supplied with alternating current from any source, for example from an alternating current dynamo 95 mounted upon the engine shaft 96. The mid point of the secondary 93 is connected to one terminal of the magnet coil 86, the other terminal of the magnet coil being connected to the cathode 97. The grids 98 are connected through the brushes 90 and 91 to the negative brush of the tachometer 99. The positive brush of the tachometer is connected to the positive pole of the battery 100, which through a variable resistance 101 is connected to the cathode 97. The tachometer and battery 100 are opposed thereby allowing a small variation in tachometer voltage to produce a relatively large variation in the effective voltage of the sensitive circuit.

The cathode 97 of the electroionic valve 87 is heated by current from a battery 102 and the value of the current is regulated by a variable resistance 103.

An electroionic valve 104 is provided for controlling the spark, and such valve is similar to the electroionic valve 87. The anodes 105 are connected to the terminals of a high tension secondary 106, which may be a second secondary of the transformer previously described, or may be the secondary of an independent transformer. The mid point of the secondary 106 is connected to one side of the spark plug 107, the other side of the spark plug being connected to the cathode 108 of the electroionic valve 104.

The cathode 108 is heated by current from a battery 109, the value of the current being regulated by a variable resistance 110.

The cathodes 108 and 97 are both connected to one side of the sensitive circuit.

The other side of the sensitive circuit divides at the slip ring 89, one branch passing to the segment 88 as previously described, and the other branch passing to the segment 111. From the segment 111 the circuit extends to the grids 113, the closing of this circuit being timed by the contacting of the segment 111 with the brush 112.

The admission of the explosion mixture and the forming of the spark are each permitted during certain independent periods in the cycle of the gas engine. Whether or not either the admission valve opens or the spark occurs, when its period in the cycle comes, depends upon the relation of the voltage of the tachometer 99 and battery 100, which in turn depends upon the speed of the engine. Thus, a variation in speed of the engine, varies the difference of potential between the grids 113 and cathode 108 and between the grids 98 and cathode 97, thereby varying the passage of current through the electroionic valves 104 and 87 respectively.

The control of the spark is secured as in the system described in Fig. 4; the double grids 113 and anodes 105, controlling both half waves of the alternating current.

The control of the inlet valve is as follows: At normal speed the charge impressed upon the grids 98 is such that a normal current is allowed to pass through the magnet coil 86, when its period of operation occurs in the engine cycle, as determined by the rotating segment 88. A decrease in speed lowers the tachometer voltage and makes the effect of the battery 100 more pronounced thereby varying the potential difference between the grids 98 and cathode 97 and allowing more current to pass, thereby causing a wider opening of the inlet valve 83 when its period of functioning comes. An increase in speed causes the tachometer voltage to rise, thereby lessening the effect of the battery 100 and varying the potential difference between the grids 98 and the cathode 97 and causing a smaller opening of the inlet valve 83 when its period of functioning comes.

The tachometer may be separately excited as shown, or it may have any of the characteristics of the tachometer previously described.

The exhaust valve 114 is closed by a spring 115 and opened by the electromagnet whose plunger 117 is connected to the valve and whose coil 116 is in the main circuit of electroionic valves 118. A battery 119 furnishes the current for this coil, and has its positive pole connected to the anode 120 while the other terminal of the coil 116 is connected to the mid point of the cathode 121. The cathode 121 is heated by current from a battery 122, the value of the current being regulated by a variable resistance 123.

The sensitive circuit passes from the grid 124 through a variable resistance 125 to a brush 126. The brush 126 is intermittently connected to a brush 129 by means of the revolving slip ring 127 and segment 128. A battery 130 in the sensitive circuit has its positive pole connected to the brush 129 and its negative pole connected to the mid-point of the cathode 121.

By intermittently closing the sensitive circuit, the current is allowed to flow intermittently through the coil 116, thereby opening the exhaust valve as the contact 128 passes under the brush 129. Large currents are not carried by the segment, slip ring and brushes, but only minute currents when positive grid control is utilized, as in the instance shown. When negative grid control is utilized no current is carried by the segment, slip ring and brushes. This negative control may be secured by a slight change in the segment, brushes, and battery connection, whereby a large negative influence is impressed upon the grid when the valve is to remain closed, and a smaller negative influence is impressed when the valve is to open.

Also the electroionic valves 118 may be placed under the control of the tachometer, whereby the functioning of the exhaust valve is also dependent upon the speed of the engine.

Figure 8:
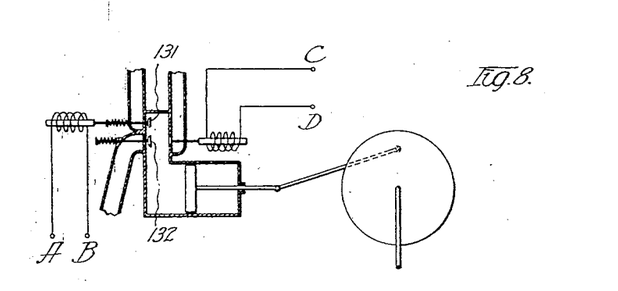
Fig. 8 shows the apparatus applied to control and regulate the richness of the explosive mixture.

Fig. 8 shows a part of a system similar to that shown in Fig. 7. The points A, B, and C, D, are to be connected at similar points in the system shown in Fig. 7. Except for the changes shown in Fig. 8, this system is identical with that shown in Fig. 7.

The inlet valve 131 controls a rich mixture, and the amount admitted to the cylinder upon intake stroke depends upon the extent of the opening of the valve 131, which in turn is electroionically controlled in accordance with the speed. An auxiliary spring pressed valve 132 supplies air to the cylinder when the pressure therein drops below a predetermined point during intake stroke. The richness of the mixture is, therefore, varied in accordance with the speed: a richer mixture supplied upon a decreasing speed, and a poorer mixture supplied upon an increase in speed.

In any of the systems described the speed of the prime mover may be controlled from the electric side of the system when the prime mover is used to drive an electric dynamo for supplying power to an outside system. In such a case, the electric load may be made to influence electroionic valves which in turn impress their effect upon both the field of the generator and the controlled circuit of the prime mover. Thus when an increase in the electric load occurs, the prime mover is influenced, or regulated, from the electric side before its speed is altered by the increase in load.

Figure 9:
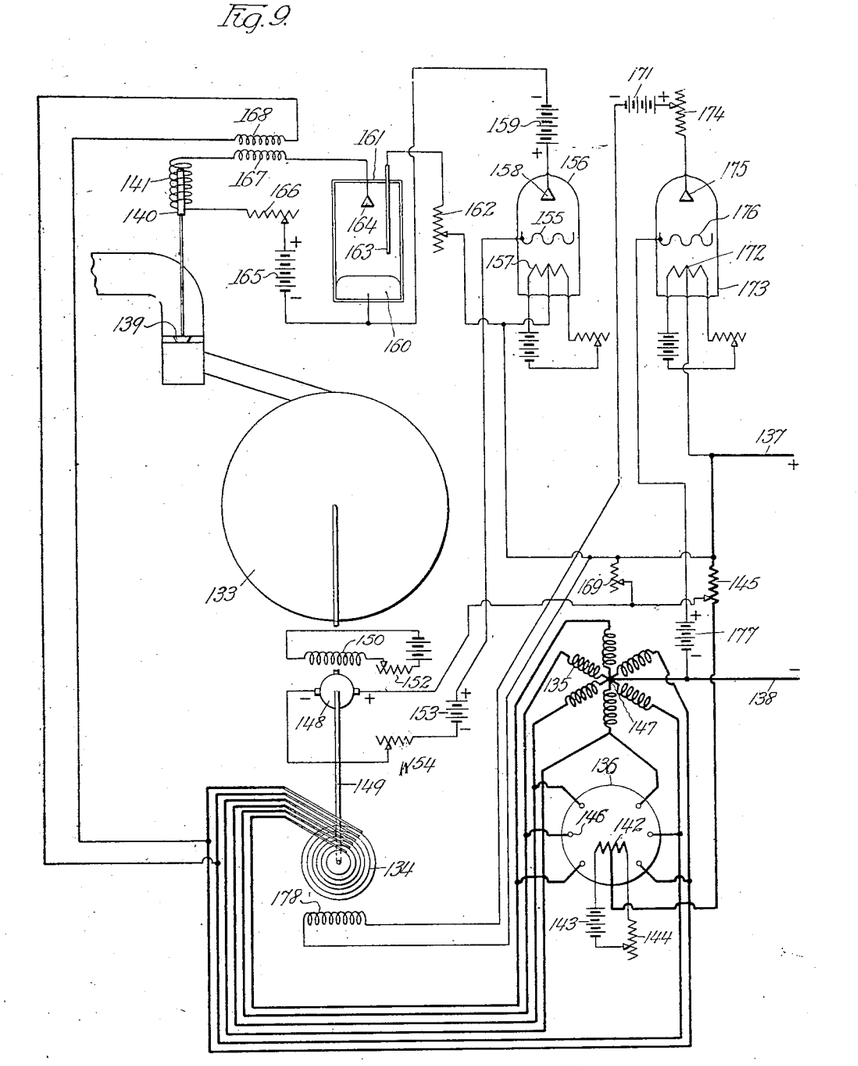
Fig. 9 shows the regulating apparatus applied to a steam turbine dynamo unit.

Fig. 9 shows a system in which a steam turbine is controlled from both the mechanical side and the electric side. A single rotor and a single control valve are shown, although a plurality of rotors, or sets of rotors, and a plurality of control valves may be used.

The steam turbine 133 is directly connected with an alternating current dynamo 134, which, through the medium of the inductive reactances 135, and electroionic rectifier valve 136, furnishes direct current to the mains 137 and 138. The turbine 133 is controlled by a pulsating admission valve 139, controlled and operated by an electromagnet which comprises a plunger 140 and a magnet coil 141. A spring may be provided to close the valve or else the pressure of the steam may be utilized. The steam is admitted in a series of puffs whose magnitude, frequency, and duration are controlled by both the speed and the load.

The electroionic valve 136 comprises a vessel evacuated to any desired degree, or else having traces or even higher pressures of a particlar gas such as argon, or it may consist of a mercury vapor rectifier. The valve 136 has a cathode 142 heated by current from a battery 143, the heating current being regulated by a variable resistance 144. The mid-point of cathode 142 is connected through a small resistance 145 with the positive main 137. A plurality of anodes 146 are connected to the respective slip rings of the dynamo 134, and also with the terminals of the inductance coils 135. The inductance coils are star connected and their neutral point 147 is connected to the negative main 138. In place of the inductance coils, the secondaries of a set of star connected transformers or auto transformers might be employed, the primaries being connected to the slip rings of the dynamo.

A tachometer 148 is mounted upon the turbine shaft 149, and has a separately excited field 150 supplied from a battery 151 and regulated by a rheostat 152. In place of the separately excited tachometer, a tachometer of other characteristics may be employed as previously described. The negative brush of the tachometer is connected to the negative pole of the battery 153 through a variable resistance 154. The positive pole of the battery is connected to the grid 155 of the electroionic valve 156, while the positive brush of the tachometer is connected through the resistance 145 with the heated cathode 157 of the electroionic valve 156. The arrangement is such that the tachometer E. M. F. is opposed by that of the battery 153 and also opposed by the drop across the resistance 145. As the effect of the tachometer increases, due to an increase in speed, the potential difference betkeen the grid 155 and cathode 157 varies so that less current is allowed to pass from the anode 158 to the heated cathode 157. When the speed decreases, an increased current is allowed to pass from the anode 158 to the heated cathode 157.

Upon the speed control of the electroionic valve 156 by the opposed tachometer 148 and battery 153, is superimposed the load control by causing the voltage drop across the resistance 145 to oppose the tachometer and aid the battery 153, whereby an increase in load aids the battery 153 in overcoming the tachometer E. M. F. and allows a greater discharge between the anode 158 and the heated cathode 157 of the electroionic valve 156.

The circuit controlled by the electroionic valve 156 is supplied by a battery 159 which has its positive pole connected to the anode 158 of the electroionic valve 156 and its negative electrode connected to the cathode 160 of the electroionic valve 161. The cathode 157 of the electroionic valve 156 has its midpoint connected, through a variable resistance 162, with the ignition electrode 163 of the valve 161.

The electroionic valve 161 may consist of a mercury vapor rectifier comprising a mercury cathode 160, an anode 164, and an ignition electrode 163. This valve controls the current passing through the magnet coil 141.

The magnet circuit comprises a battery 165 whose negative pole is connected to the cathode 160, and whose positive pole is connected, through a variable resistance 166 to one terminal of the magnet coil 141. The other terminal of the magnet coil is connected, through the secondary 167 of a transformer, to the anode 164. The primary 168 of the transformer is connected with a source of alternating current, as shown, for example, across a pair of slip rings of the dynamo 134.

The arc established between the anode 164 and the cathode 160 of the electroionic valve 161 is extinguished every other half wave of the alternating current by having such alternating current from the secondary 167 of the transformer superimposed upon the direct current supplied by the battery 165. When the alternating E. M. F. of the secondary 167 opposes the battery during one half wave, the arc is extinguished. Thereafter, the combined, or added, E. M. F. of the transformer and battery is not sufficient to reestablish the arc during the succeeding half wave. The arc may be re-established during every other half wave by causing an arc to strike from the ignition electrode 163 to the cathode 160; the point of ignition in the alternating current cycle being wholly under the control of the ignition electrode circuit; in fact the main arc may even be suppressed during one or more half waves. If the arc is established every other half wave, but at varying points in the cycle, the amplitude and duration of the pulsations of the valve, vary, or are controlled. If the arc is not established during every other half wave the valve misses one or more pulsations.

By the action of this system the pulsations of the valve are controlled by both the speed of the turbine and the load upon the dynamo. The turbine is controlled by varying the frequency, duration, and amplitude of the pulsations of the valve in accordance with the demands of the system.

The normal speed of the turbine may be varied by varying the resistance 152; the sensitiveness may be varied by varying the resistance 154; and the characteristics of the system may be varied by either varying the characteristics of the tachometer, as previously described, or by varying the resistance 145. The last control, that is, the control of the characteristics by varying the resistance 145 may be effected as stated; or it may be effected by providing a variable shunt resistance 169, whereby the effects of a change in voltage drop across the resistance 145 may be made more or less pronounced; or it may be effected by providing a plurality of taps, or points, upon the resistance 145 whereby any fraction of the voltage drop may be employed.

The voltage of the dynamo may be controlled by providing an electroionic control of the dynamo field. One terminal of the field coil 178 is connected to the negative pole of a battery 171, and the other terminal to the mid-point of the heated cathode 172 of an electroionic valve 173. The positive pole of the battery 171 is connected, through a variable resistance 174 to the anode 175 of the electroionic valve.

The electroionic valve 173 has a grid 176 which is connected to the positive pole of a battery 177. The negative pole of the battery 177 is connected with the negative main 138, the positive main being connected to the mid-point of the cathode 172. The battery E. M. F., therefore, opposes the voltage of the mains.

When the voltage of the mains varies, the effect of the battery 177 upon the grid 176 is varied in such a manner that the field 178 of the dynamo is strengthened or weakened, respectively, as the voltage of the mains decreases or increases.

In all of the systems disclosed, magnified corrective influences are impressed upon the controlled mechanisms, in instant accordance with the demands, or functioning of the systems; and are instantly withdrawn when the need therefor ceases. Therefore, it is possible to utilize powerful relay effects and yet prevent hunting or periodic pulsations in the system as a whole.

As the current may be only momentarily flowing in certain of the valve magnets, the voltages impressed thereon may be many times the normal voltage at which such magnets operate.

Obviously other structures may be devised which will embody the invention herein set forth.

What is claimed is:

1. The combination with a machine for converting the energy of a fluid into kinetic energy and subject to varying speed and load conditions, of means for directly controlling the energy supplied to said machine, and an electroionic valve rendered coincidently responsive to the varying conditions and modifying the action of said controlling means in accordance with the varying conditions.

2. Means for controlling the supply of energy to a prime mover subject to variations in load and other conditions comprising, in combination, an electroionic valve, means subjecting the same substantially coincidently to influence of such variations, and means controlled by said electroionic valve to impress corresponding corrective influence simultaneously upon said supply of energy to the prime mover.

3. In a regulator for a machine subject to variations in speed and which converts the energy in a fluid into kinetic energy, the combination with means for admitting said fluid to the machine, of an electroionic valve, a controlling circuit synchronously registering the speed variations of the machine and simultaneously impressing its registration directly upon said electroionic valve to vary the discharge thereof in accordance with the varying conditions, and a controlled circuit interlinking the fluid admission means and the electroionic valve so that the variations in discharge in the latter produce regulative effects in said fluid admission means in substantial synchronism with variations in speed of the machine.

4. A regulator for a machine subject to variations in speed for converting the energy in a fluid into kinetic energy, comprising means simulating the speed conditions of the machine, an electroionic valve the discharge characteristics of which are varied in accordance with the varying conditions of an electro-motive force produced by said speed simulating means, and fluid admission means for said machine the operation of which is regulated by said electroionic valve substantially coincidently and in accordance with variations in discharge in the latter.

5. A regulator for a turbine subject to varying load conditions, comprising means simulating the operating conditions of said turbine, an electroionic valve the discharge characteristics of which are varied in accordance with the varying conditions of an electro-motive force produced by said speed simulating means, a pulsating valve for admitting fluid energy to said turbine, and means interlinking said fluid admission valve and said electroionic valve for regulating the operation of the former substantially coincidently and in accordance with variations in discharge in the latter.

6. A regulator for a turbine subject to variations in load, comprising means simulating the operating conditions of the turbine and simultaneously responsive to speed variations thereof, a pulsating valve for admitting fluid energy to said turbine, operating means therefor, and an electroionic valve interlinking said first mentioned means and said admission valve operating means so that variations in operating conditions in said first mentioned means are coincidently magnified by the electroionic valve and a magnified regulating effect is simultaneously impressed upon the admission valve operating means in accordance with the varying conditions.

7. The combination with a machine, subject to varying load and energy supply conditions, for converting the energy in a fluid into kinetic energy, of means for controlling a supply of fluid to said machine, means simulating the operating conditions of the energy conversion machine and simultaneously responsive to the varying conditions, an electroionic valve the discharge characteristics of which are varied in accordance with the varying conditions by an electromotive force produced by said second mentioned means and impressed upon said electroionic valve, and circuit connections between said electroionic valve and said fluid supply controlling means whereby variations in the discharge characteristics of the former produce regulative effects on the latter in substantial synchronism with the varying conditions.

8. A regulator for a turbine subject to varying speed and load conditions, comprising means simulating the operating conditions of said turbine, an electroionic valve the discharge characteristics of which are varied in accordance with the varying conditions of an electro-motive force produced by said means, a pulsating valve for admitting fluid energy to said turbine, and means for regulating the magnitude, frequency and duration of the pulsations of said fluid admission valve substantially coincidently and in accordance with variations in the discharge in said electroionic valve.

9. The combination with a turbine of a dynamo electric machine driven thereby, a load circuit connected with said dynamo, an electroionic valve arranged to vary the field strength of said dynamo in accordance with variations in the load thereon, a pulsating valve for admitting fluid energy to said turbine, means simulating the speed conditions of said turbine and an electroionic valve subjected to control by said speed simulating means and the load on said circuit for controlling said pulsating valve to vary the magnitude frequency and duration of the pulsations of the latter substantially coincidently and in accordance with variations in the speed of said turbine and the load on said circuit.

10. The combination with a turbine of a dynamo driven thereby, a load circuit supplied by said dynamo, means including an electroionic valve influenced by the load on said circuit to vary the field strength of said dynamo and maintain the voltage of said circuit substantially constant irrespective of variations in load thereon, means simulating the speed conditions of said turbine, an electroionic valve, the discharge characteristics of which are varied in accordance with the varying conditions of an electro-motive force dependent upon said speed simulating means and upon the load on said circuit, a pulsating fluid admission valve for said turbine and means for controlling the magnitude frequency and duration of pulsations thereof in accordance with variations in discharge in said last mentioned electroionic valve substantially coincidentally and in accordance with variations in the speed of said turbine and the load on said circuit.

In witness whereof, I have hereunto subscribed my name.

FRIEDRICH WILHELM MEYER.